UNITED STATES PATENT OFFICE.

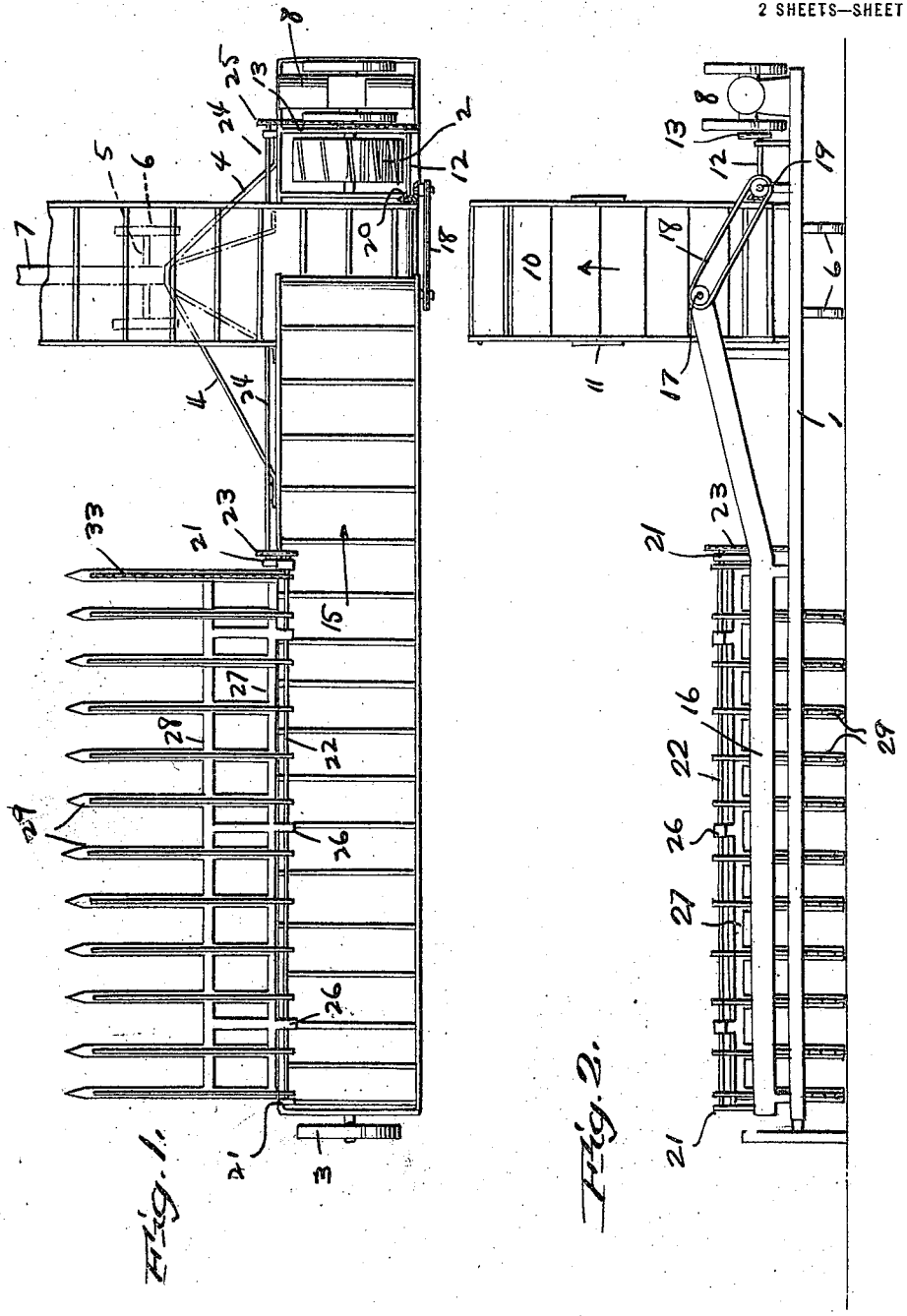

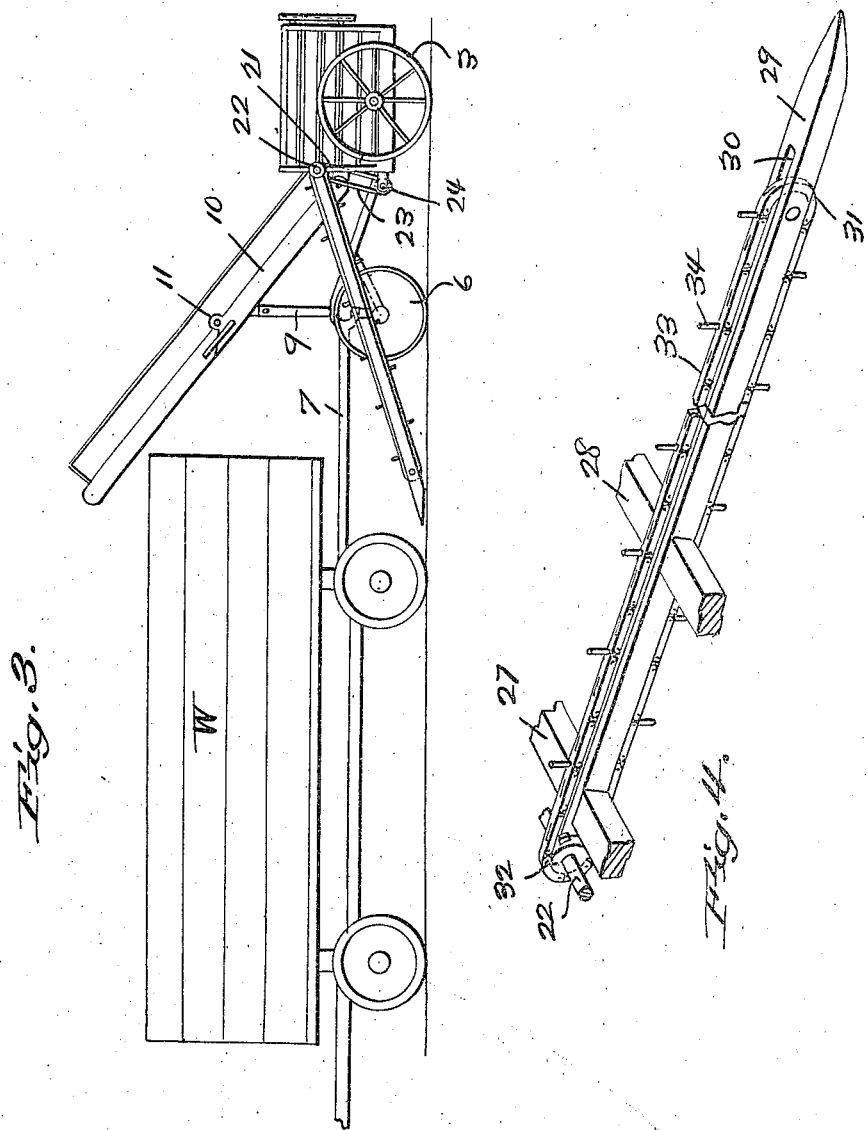

CHARLEY FRAHM, OF WESTBROOK, MINNESOTA.

GRAIN-SHOCK LOADER.

1,296,644.

Specification of Letters Patent.

Patented Mar. 11, 1919.

Application filed July 19, 1918. Serial No. 245,754.

*To all whom it may concern:*

Be it known that I, CHARLEY FRAHM, a citizen of the United States, residing at Westbrook, in the county of Cottonwood and State of Minnesota, have invented certain new and useful Improvements in Grain-Shock Loaders, of which the following is a specification.

This invention relates to harvesters, and more especially to hay loaders using endless belts; and the object of the same is to produce a machine of this kind for gathering hay or grain, especially when in the form of shocks, and delivering it to a wagon as the machine is drawn across the field. Another object is to provide for driving this machine by means of a small engine if preferred.

Principally the machine is devised to take the place of manual labor which is now so difficult to secure, because it can perform the work of several hands while it needs the attention of but one man.

Details of the preferred construction of my invention are set forth below and shown in the drawings wherein:—

Figure 1 is a plan view and

Fig. 2 a rear elevation of this machine, the former including and the latter omitting the bull wheel, Fig. 3 is a left end elevation of the machine at work, showing it as hitched behind a wagon, Fig. 4 is a perspective detail of one of the tines.

The main frame 1 of this machine is of considerable length transversely, and is supported at its inner end by what might be called the bull wheel 2 and at its outer end by a side wheel 3; and braces 4 lead forward from the frame to a truck 5 having its own wheels 6 and a tongue 7 which, in Fig. 3, is shown as hitched behind a wagon W. It is quite possible that the several mechanisms mounted on this main frame may be driven by the rotation of the bull wheel 2, and I reserve the right to so construct my machine. But in the present illustration I have shown a small engine 8 mounted on the right hand end of the frame and will describe the connections from the mechanism to this engine instead of to the bull wheel. If an engine be employed, it is quite possible that it may be connected with the bull wheel and in that way assist in propelling the machine, although when at work the connection of the tongue 7 with a wagon W is ordinarily sufficient to cause the machine to trail behind the wagon into whose body the grain, hay, or shocks collected are to be dumped.

Supported from the truck 5 by an upright 9 is an elevator 10 extending forwardly and upwardly over said truck and provided with a knuckle or hinge at 11 so that it may be folded into smaller space. By preference the lower roller of this elevator is mounted on a shaft 12 which is connected by belting 13 or otherwise with the engine 8, although if said shaft were driven from the bull wheel it would rotate when the machine moved forward, and in either case the elevator moves upward as seen in Fig. 2. Delivering onto the lower portion of this elevator is a carrier 15 whose frame 16 parallels and overlies the main frame 1 for most of its length as seen in Fig. 2 and then rises slightly; and the inner roller of this carrier by preference has a pulley 17 connected by belting 18 with a pulley 19 whose shaft in turn is geared as at 20 to said shaft 12. Therefore the rotation of the latter causes the carrier to move in the direction of the arrow in Fig. 1, so that whatever is thrown or delivered onto the carrier is raised by the elevator and will be dumped into the wagon body if the machine is trailed behind a wagon as shown in Fig. 3.

In standards 21 rising from the front of the main frame is mounted a shaft 22 whose inner end is connected by pulleys and belting 23 with another and lower shaft 24 extending along the front of the frame and beneath the elevator, its innermost end being connected by a pulley 25 with the belt 13 described above; and therefore as the machine progresses or the engine moves the shafts 24 and 22 will be rotated. Pivotally mounted on the shaft 22 are eyes 26 at the rear end of a skeleton structure including an upper cross bar 27, a lower cross bar 28 and a series of fingers or tines 29 whose construction is best shown in Fig. 4; and it is obvious that when this skeleton structure is permitted to descend at its front end, the tips of the tines rest upon the ground as seen in Fig. 3. However, any suitable means not necessary to illustrate may be employed for raising and lowering the entire structure as when the machine is not at work at all and is being driven over the roadway, or when it is at work and it is desired that the tips of the tines will not run into the ground.

The body of each tine is slotted longitudinally as shown at 30, and within said slot near the tip of the tine is rotatably mounted a sprocket wheel 31. Corresponding sprocket wheels 32 are mounted on the shaft 22, and over each pair of sprockets extends an endless chain 33 carrying fingers 34 outstanding from it. Therefore as said shaft 22 rotates, the fingers pass rearwardly and upwardly over the tines, around the sprockets 32 on the shaft, and back on the under side of the tines and upward through the slots 30. By this means hay or grain, and especially all shocks picked up by the tips of the tines are carried upward over the fingers or tines and dropped onto the carrier 15. By the latter they are carried inward and dropped onto the elevator 10. By the elevator they are in turn raised and dropped into the wagon body W as the machine progresses over the field.

Thus is constructed a machine for gathering hay or grain or shocks, and perhaps it might well be used for gathering vines or plants, or for other purposes if the tines were sufficiently close together, which machine is limited in its capacity only by the length of the main frame and therefore the width of the path covered in its action. It may be built of comparatively light materials, consistently with strength, and it can be drawn behind a wagon W which in turn is drawn by a team or at least two teams of horses driven by one man. If horses are not available in sufficient numbers, a small gasolene engine 8 can assist in propelling this machine, and the engine would be extremely useful for moving the machine from point to point when it was not at work, provided of course that connections were made between the engine and the bull wheel. These details are not necessary to illustrate. Nor have I illustrated the means for adjusting the height of the tips of the tines, but I apprehend that something is necessary because otherwise said tips might be pushed into the earth. Nor have I thought it necessary to illustrate and describe the control mechanism for the engine if the engine is used, and clutch mechanisms which will doubtless be employed to connect the several elements with and disconnect them from the power at will.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:—

In a loader, the combination with a frame relatively long in a direction at right angles to the line of draft and having supporting wheels near its extremities, driving mechanism at its inner end, an elevator whose frame is connected with the main frame near said driving mechanism and which elevator is driven thereby, and a carrier extending the length of the main frame and delivering to the elevator, the carrier being also driven by such driving mechanism; of gathering tines along the front edge of said frame near its outer end, and an elevator carried by each tine for raising the material picked up by it and delivering the same to said carrier.

In testimony whereof I affix my signature in presence of two witnesses.

CHARLEY FRAHM.

Witnesses:
C. T. MEYER,
P. D. NORTON.